W. L. BLISS.
GENERATOR MOUNTING.
APPLICATION FILED JULY 10, 1916.

1,398,830.

Patented Nov. 29, 1921.
3 SHEETS—SHEET 1.

Witnesses
David H. Tinkler
Ralph Munden

Inventor
William L. Bliss.
By Raymond H. Van Vleet
Attorney

W. L. BLISS.
GENERATOR MOUNTING.
APPLICATION FILED JULY 10, 1916.

1,398,830.

Patented Nov. 29, 1921
3 SHEETS—SHEET 2.

Witnesses
David H. Tinkler
Ralph Munden

Inventor
William L. Bliss
By Raymond H. Van Vleet
Attorney

W. L. BLISS.
GENERATOR MOUNTING.
APPLICATION FILED JULY 10, 1916.

1,398,830.

Patented Nov. 29, 1921.
3 SHEETS—SHEET 3.

Witnesses
David H. Tinkler.
Ralph Munden

Inventor
William L. Bliss.
By Raymond H. Van Vest.
Attorney

UNITED STATES PATENT OFFICE.

WILLIAM L. BLISS, OF NIAGARA FALLS, NEW YORK, ASSIGNOR TO U. S. LIGHT & HEAT CORPORATION, OF NIAGARA FALLS, NEW YORK, A CORPORATION OF NEW YORK.

GENERATOR-MOUNTING.

1,398,830.    Specification of Letters Patent.    Patented Nov. 29, 1921.

Application filed July 10, 1916. Serial No. 108,381.

*To all whom it may concern:*

Be it known that I, WILLIAM L. BLISS, a citizen of the United States, residing at Niagara Falls, in the county of Niagara and State of New York, have invented new and useful Improvements in Generator-Mountings, of which the following is a specification.

The present invention relates to generator mountings.

In mounting the generator of a car lighting system wherein the moving parts of the generator are driven from the car axle, it is common practice to suspend the generator from the truck which carries the car axle. It is also common practice to suspend the generator from the body of the car. The present invention relates to the latter method of mounting the generator.

In mounting car lighting generators on the body of the car, rather than the truck, it is necessary to provide means for adjusting the generator relative to the car axle and also to compensate for differences in the distance which may exist between the axes of the generator and the car axle under the conditions of service. The present invention relates to means for mounting the generator whereby these adjustments may be conveniently accomplished and whereby the differences in the distance between the generator and car axle axes are substantially compensated for.

In most car lighting systems the generator is connected to the car axle by means of a belt. It is usually requisite that the tension of said belt should be maintained substantially constant, the regulation of the output of the generator being accomplished by means independent of the belt. The present invention relates to apparatus for use in systems wherein it is desirable to maintain the belt tension substantially constant.

One of the objects of the present invention is to provide a convenient mounting whereby the car lighting generator may be suspended from the car body and in which the necessary adjustments may be conveniently made.

A further object is to provide a mounting for a car lighting generator which will occupy a minimum of space longitudinally of the car and in which, through a novel arrangement of parts, the differences in the distance between the generator and axle axes will be compensated for to maintain substantially constant belt tension.

A further object is to provide a mounting for a car lighting generator adapted to be attached to the car body which is adaptable to the varying configuration of the various cars in service.

Further objects will be apparent as the description proceeds.

One embodiment of the present invention is disclosed in the accompanying drawings, in which—

Figure 1:
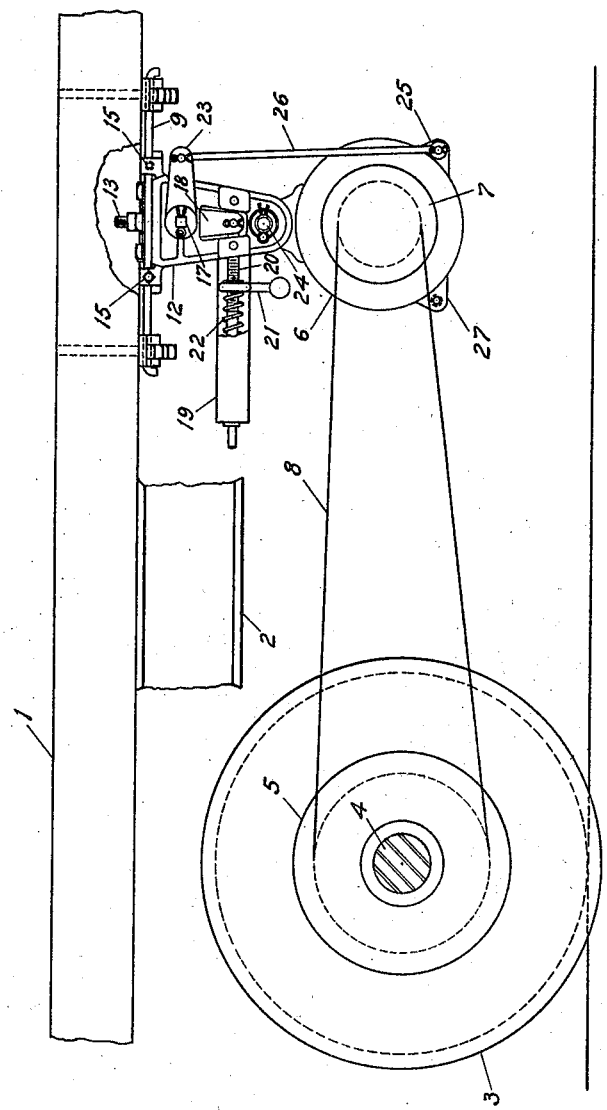
Figure 1 represents a side elevation of the invention.

Sills extending longitudinally of the car are represented by the numeral 1, which sills may be supported in any suitable way by the longitudinal steel I-beams 2. The car wheel is represented by the numeral 3, which wheel is securely mounted on the car axle 4. The car axle 4 will have mounted thereon the flanged pulley 5. The car lighting generator is represented by the numeral 6. The shaft of said generator is provided with a flanged pulley 7, which pulley is connected to the axle pulley 5 by the belt 8.

Figure 2:
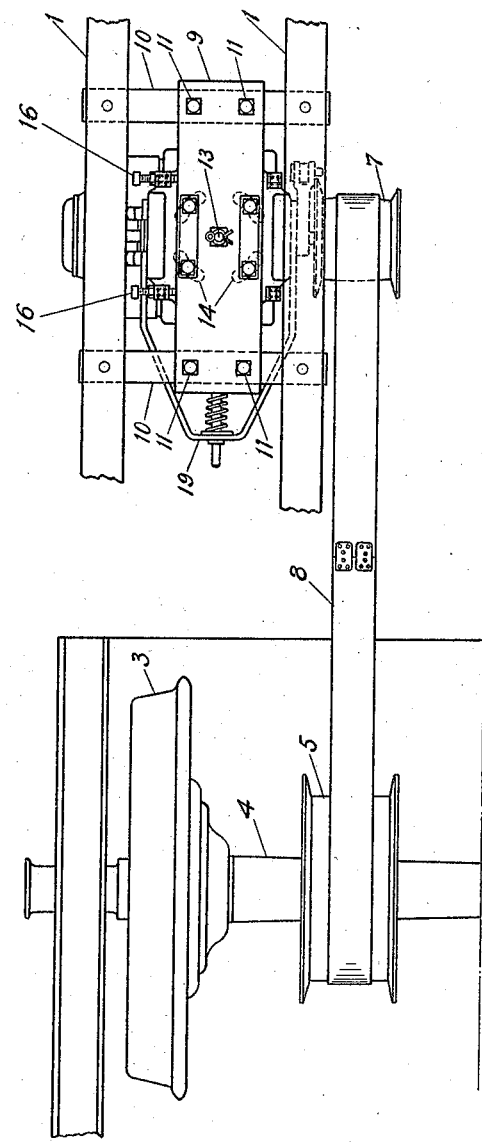
Fig. 2 represents a plan view.
Figure 3:
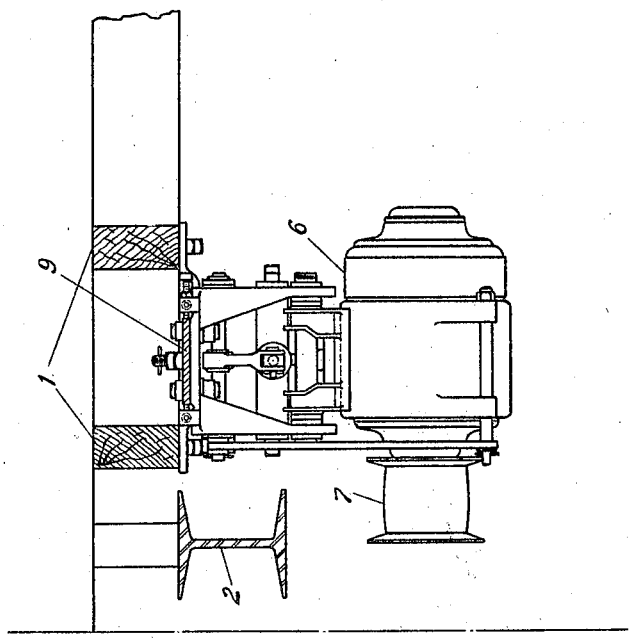
Fig. 3 represents an end elevation.

The means by which the generator 6 is mounted beneath the car body will now be described. Mounted directly beneath the sills 1 is a plate 9 which may be secured to said sills in any suitable manner. As represented, the plate 9 is mounted on cross-bars 10—10, which are suitably bolted to said sills 1. The plate 9 is securely fastened to the cross-bars 10—10 by means of bolts 11. Mounted directly below the plate 9 is a hanger 12 which hanger is provided with an upwardly extending bolt 13 adapted to extend through a centrally located hole in the plate 9. The hanger 12 is preferably a steel casting and on its upper side may be provided with four circumferentially placed slots 14 which will coincide with four bolt holes located in the plate 9. Suitable bolts will be provided which will extend through the bolt holes and slots 14. Suitable nuts will be provided to hold the hanger up into engagement with the plate 9. The upper surface of the casting 12 is preferably substantially square in outline and has lugs 15 at each of its four corners. The lugs 15 will be spaced apart a distance slightly greater than the width of the plate 9. Each of the lugs 15 will preferably be cross drilled and tapped so that bolts 16 may be threaded therethrough in either of two directions at right angles to one another. It will be apparent that by mounting the casting 12 beneath the plate 9 it will be possible to turn the casting 12 within limits to the desired angular relation to the plate 9. The idea of cross drilling and tapping the lugs 15 is for the following purpose. In certain cars it may be found more convenient to place the plate 9 transversely of the car body instead of longitudinally, as shown in the drawing. It will be necessary, however, to mount the generator with its axis transverse of the car body. In such a case, the plate 9 will lie between the left hand lugs and the right hand lugs, as shown in Fig. 2, and the bolts 16 will be used in the cross drilled holes in said lugs.

The hanger 12 is provided with a shaft 17 which is adapted to rotate in suitable bearings in said hanger. Rigidly mounted on said shaft 17 and depending therefrom, is a lever 18. Suitably mounted on said hanger is a yoke 19. Pivotally mounted at the lower end of the lever 18 is a threaded rod 20, the outer extremity of which is adapted to ride through a suitable opening in the yoke 19. Mounted between the yoke 19 and the nut 21 on the rod 20 is a spring 22. Inasmuch as the hanger 12 is rigidly mounted on the car body and the yoke 19 is rigidly mounted on the hanger 12, it is clear that the spring 22 will tend to urge the lower extremity of the lever 18 in a right hand direction, as shown in Fig. 1. Also rigidly mounted on the rotatable shaft 17 and in a plane substantially at right angles to the plane of the lever 18, is a lever 23. The hanger 12 is provided with a second transversely extending shaft 24 upon which the generator 6 is mounted in a position to swing relative to the hanger 12. Below the center line of the generator 6 and to the right hand of the vertical center line of said generator, as viewed in Fig. 1, is a pivot 25. Between the pivot 25 and the outer extremity of the lever 23 is a rod 26. In practice the generator 6 will be provided with a second lug 27, provided with a pivot corresponding to the pivot 25, whereby the generator may be reversely mounted if it should be found desirable, in which case the pulley 5 would be shifted along the axle 4.

The manner in which the embodiment of the invention as illustrated accomplishes the above mentioned objects of the invention, will now be described. It has been set out above that the plate 9 may be arranged either longitudinally or transversely of the car body, without necessitating any change in the hanger 12, the location and the cross drilling of the lugs 15 permitting the hanger 12 to be turned into the proper angular relation with said plate 9. In applying the generator mounting to a car, the bolts 16 will be turned until the hanger holds the generator axis in parallel relation with the axle 4. The nut 21 will be tightened up until the spring 22, acting through the lever 18, shaft 17, lever 23, rod 26 and generator 6, puts the belt under the required tension. As long as the distance between the centers of the pulleys 5 and 7 remains the same, assuming no stretching of the belt, the tension on the belt 8 will remain constant. However, should the distance between the pulleys 5 and 7 tend to decrease, due for instance to the action of the car in rounding a curve, the moment arm through which the lever 23 exerts its pull on the generator around the shaft 24 will be decreased. This may be understood by considering that the perpendicular drawn from the shaft 24 to the rod 26 will be decreased as the generator 6 moves in a left hand direction. Therefore, although movement of the generator 6 in the left hand direction will tend to increase the tension on the spring 22, the moment arm through which said spring acts upon the generator 6 will be accordingly decreased, leaving the net pull on the belt substantially constant. Conversely, should the generator 6 tend to swing in a right hand direction away from the axle 4, due to stretching of the belt or to the car rounding a curve, the moment arm through which the force applied along the rod 26 acts around the pivot 24 will be increased, thus compensating for the decreased tension of the spring 22, leaving the tension on the belt substantially unchanged.

It will be clear that due to the novel arrangement of the parts above disclosed, the result has been accomplished that a substantially constant belt tension is maintained under conditions encountered in service and that a minimum of the length of the car is utilized.

Many modifications may be made in the invention as disclosed, without departing from the spirit of said invention. It is desired to cover in this case all such modifications that come within the scope of the appended claims.

What I claim as new and desire to secure by Letters Patent of the United States is:

1. A generator mounting comprising, in combination, a plate, and a hanger adapted to be supported by said plate, said hanger being provided with lugs adapted to straddle said plate in pairs.

2. A generator mounting comprising, in combination, a plate, and a hanger adapted to be supported by said plate, said hanger being provided with lugs adapted to straddle said plate in pairs, each of said lugs being cross drilled and tapped.

3. A generator mounting comprising, in combination, a plate member, a hanger member adapted to be supported by said plate member, one of said members being provided with circumferentially placed slots to correspond with circumferentially placed bolt holes in the other member, and bolts for holding said members in angularly adjustable relation, said hanger being provided with lugs, said lugs being adapted to receive bolts to hold said members in fixed angular relation.

4. A generator mounting comprising, in combination, a hanger, a generator pivotally mounted on said hanger, a second pivotally mounted member carried by said hanger, said second member having two arms in planes substantially at right angles to one another, one of said arms being spring-pressed, and a rod connecting the other of said arms with said generator.

5. A generator mounting comprising, in combination, a hanger, a generator pivotally mounted on said hanger, a second pivotally mounted member carried by said hanger, said second member having two arms angularly spaced, one of said arms being spring-pressed, and connecting means connecting the other of said arms with said generator.

6. A generator mounting comprising, in combination, a hanger, a generator pivotally mounted on said hanger, a second pivotally mounted member carried by said hanger, said second member having two arms, connecting means between one of said arms and said generator, and means operating on the other arm to urge said connecting means away from the point of pivotal mounting of said generator.

7. In a generator mounting, in combination a member adapted to be fastened to a car body, a hanger fastened to said member by means of a holding member placed centrally of said hanger, bolts for securing said hanger to said member but permitting angular adjustment thereof, and adjustable means for securing said hanger against angular movement relative to said member.

8. In a generator mounting, in combination, a member adapted to be fixed relative to a car, a hanger adapted to be pivotally supported by said member and capable of angular adjustment relative to said member, and adjustable means for securing said hanger against angular movement relative to said member.

9. In combination, a car body, a supporting member attached thereto having depending side members, a generator pivotally supported by said side members, said generator being adjustable relative to said car body in a horizontal plane, and adjustable means for securing said generator against angular movement in said horizontal plane.

10. A dynamo suspension having in combination with a car and its axle, a frame rigidly secured to the car body, a dynamo having lugs rigid therewith and pivoted to said frame, whereby the dynamo is pivotally suspended from the car body, a belt driving the dynamo from the car axle, means for adjusting the pivotal support of the dynamo to aline the dynamo with the axle, a tension device comprising a spring tending to swing the dynamo away from the driving axle, and means for adjusting the tension of said spring independently of the adjustment of said pivotal support.

11. A dynamo suspension for cars having in combination with a car and its axle, a dynamo having lugs rigid therewith, a belt driving the dynamo from the car axle, a frame rigid with the car body, said lugs being pivotally connected directly to said frame whereby the dynamo is pivotally suspended from the car body, a pivoted lever for swinging said dynamo about said pivot and a compressed spring acting on said lever and tending to swing the dynamo away from the axle.

12. A dynamo suspension having in combination with a car and its axle, a frame rigidly secured to the car body, a dynamo having lugs rigid therewith and normally loosely pivoted to said frame around a single axis whereby the dynamo is pivotally suspended from the car body, a belt driving the dynamo from the car axle, a tension device comprising a spring under compression, tending to swing the dynamo away from the driving axle, and means for adjusting the tension of said spring independently of said pivotal support.

13. A dynamo suspension having in combination with a car and its axle, two members extending transversely of the car and secured to the underneath side of the car body, a supporting member secured to said members, a dynamo normally loosely pivoted to move around its longitudinal axis and suspended from said supporting member between said transverse members and means driving the dynamo from the car axle.

14. A dynamo suspension having in combination with a car and its axle, two members extending transversely of the car and secured to the underneath side of the car, a supporting member secured to said members, a dynamo pivotally suspended from said supporting member, a belt driving the dynamo from the car axle, and a spring tending to swing the dynamo around its pivotal point away from the car axle.

15. In combination, a pivotally mounted generator adapted to be driven by a belt, a spring for producing belt tension, a bell crank lever and a tension rod for transmitting tension to said generator to maintain said belt tension, said lever and tension rod being mounted to rapidly vary the moment of the force applied by the spring to the generator in response to angular motion of said generator.

In witness whereof, I have hereunto subscribed my name.

WILLIAM L. BLISS.